(12) United States Patent
Wieners et al.

(10) Patent No.: US 9,671,281 B2
(45) Date of Patent: Jun. 6, 2017

(54) IMAGING SYSTEMS WITH DIGITAL MICROMIRROR DEVICES (DMD)

(71) Applicant: Sensors Unlimited, Inc., Princeton, NJ (US)

(72) Inventors: John A. Wieners, Morrisville, PA (US); Henry W. Neal, Princeton, NJ (US)

(73) Assignee: Sensors Unlimited, Inc., Princeton, NJ (US)

( * ) Notice: Subject to any disclaimer, the term of this patent is extended or adjusted under 35 U.S.C. 154(b) by 138 days.

(21) Appl. No.: 14/858,743

(22) Filed: Sep. 18, 2015

(65) Prior Publication Data

US 2017/0082487 A1    Mar. 23, 2017

(51) Int. Cl.
*H04N 5/33* (2006.01)
*G01J 1/42* (2006.01)
*G01J 1/04* (2006.01)

(52) U.S. Cl.
CPC ............. *G01J 1/42* (2013.01); *G01J 1/0411* (2013.01); *G01J 1/0414* (2013.01)

(58) Field of Classification Search
CPC ........... G01J 1/42; G01J 1/0411; G01J 1/0414
USPC ................................ 250/208.1, 349; 348/164
See application file for complete search history.

(56) References Cited

U.S. PATENT DOCUMENTS

| | | | |
|---|---|---|---|
| 7,969,639 B2 | 6/2011 | McNie et al. | |
| 8,153,980 B1 | 4/2012 | Brady et al. | |
| 8,188,434 B2 | 5/2012 | Ayer | |
| 8,406,859 B2 | 3/2013 | Zuzak et al. | |
| 8,783,874 B1 | 7/2014 | Riza | |
| 2011/0134249 A1* | 6/2011 | Wood | G01C 3/08 348/164 |
| 2012/0050533 A1 | 3/2012 | Dewa et al. | |
| 2013/0083312 A1* | 4/2013 | Baraniuk | G01J 3/2823 356/51 |
| 2014/0231650 A1* | 8/2014 | Streuber | H01L 27/14625 250/349 |
| 2015/0051498 A1 | 2/2015 | Darty | |
| 2017/0041571 A1* | 2/2017 | Tyrrell | H04N 7/183 |

* cited by examiner

*Primary Examiner* — Seung C Sohn
(74) *Attorney, Agent, or Firm* — Locke Lord LLP; Scott D. Wofsy; Alicia J. Carroll

(57) ABSTRACT

An imaging system includes an imager housing having a primary aperture defining an optical axis. A primary lens is disposed over the primary aperture. A first focal plane array (FPA) is within the imager housing. A second FPA is within the imager housing. A digital micro-mirror device (DMD) is angled with respect to the optical axis and optically coupled to the primary lens to selectively reflect light entering the primary aperture to at least one of the first FPA or the second FPA.

10 Claims, 2 Drawing Sheets

IMAGING SYSTEMS WITH DIGITAL MICROMIRROR DEVICES (DMD)

BACKGROUND OF THE INVENTION

1. Field of the Invention

The subject invention relates to imaging systems, and more particularly to optical detection systems.

2. Description of Related Art

Many imaging technologies use optical detectors to capture light and form an image based on the light captured. Forming images by capturing light in two distinct wavelength ranges generally requires separating the light into the two ranges and redirecting it to the appropriate focal plane array (FPA) by either using two separate apertures or using a single aperture with a beam splitter.

Traditional imagers have been satisfactory for their intended purpose, however, there is ongoing need in the art for improved imaging systems.

SUMMARY OF THE INVENTION

An imaging system includes an imager housing having a primary aperture defining an optical axis. A primary lens is disposed over the primary aperture. A first focal plane array (FPA) is within the imager housing. A second FPA is within the imager housing. A digital micro-mirror device (DMD) is angled with respect to the optical axis and optically coupled to the primary lens to selectively reflect light entering the primary aperture to at least one of the first FPA or the second FPA.

The DMD can define a DMD axis oblique to the optical axis. The second FPA can be aligned with the DMD axis and the first FPA is angled with respect to the DMD axis. The first FPA and the second FPA can be on the same side of the optical axis. The first FPA can be a long-wave infrared (LWIR) FPA and the second FPA can be a short-wave infrared (SWIR) FPA. The imaging system can include a LWIR filter optically coupled to the LWIR FPA and a SWIR filter optically coupled to the SWIR FPA. The first FPA can define a FPA axis.

In accordance with some embodiments, the DMD includes a plurality of mirrors that are selectively rotatable to adjust the DMD between at least four states. The four states can include a first energized state, a second energized state, a third energized state and/or an unenergized state. In the unenergized state, surfaces of the mirrors can be aligned with the DMD axis to reflect light entering the primary aperture between the first FPA and the second FPA. In the first energized state, surfaces of the mirrors can be angled with respect to the DMD axis to reflect light entering the primary aperture to the second FPA along the DMD axis. In the second energized state, surfaces of the mirrors can be angled with respect to the DMD axis to reflect light entering the primary aperture to the first FPA along the FPA axis. In the third energized state, surfaces of the mirrors can be angled with respect to the DMD axis to reflect light entering the primary aperture to the first FPA along the FPA axis, and/or the second FPA along the DMD axis.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
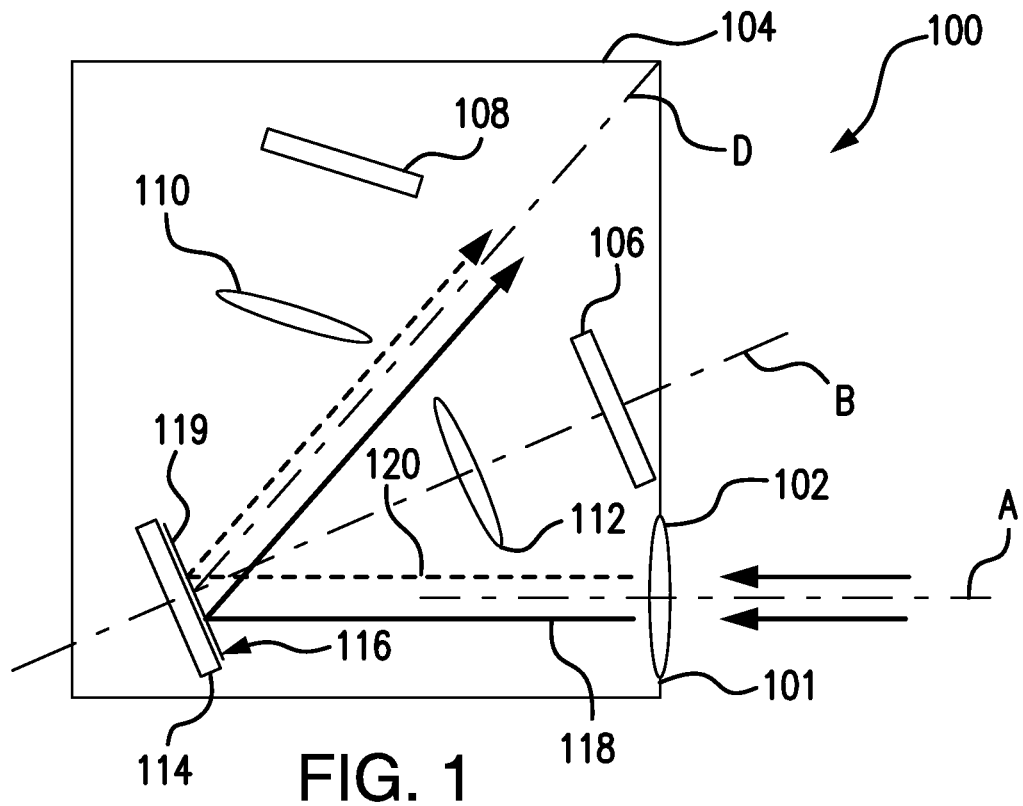
FIG. 1 is a schematic view of an exemplary embodiment of an imaging system constructed in accordance with the present invention, showing a DMD in an unenergized state.

Reference will now be made to the drawings wherein like reference numerals identify similar structural features or aspects of the subject disclosure. For purposes of explanation and illustration, and not limitation, a partial view of an exemplary embodiment of an imaging system in accordance with the disclosure is shown in FIG. 1 and is designated generally by reference character 100. Other embodiments of imaging systems in accordance with the disclosure, or aspects thereof, are provided in FIGS. 2-4, as will be described. The systems and methods described herein provide for imaging systems with a single aperture that capture images in two distinct wavelength ranges, resulting in reduced or eliminated parallax error.

As shown in FIG. 1, imaging system 100 includes an imager housing 104 having a primary aperture 101 defining an optical axis A. A primary lens 102 is disposed over primary aperture 101. A first FPA 108, e.g. LWIR FPA 108, and a second FPA 106, e.g. a SWIR FPA 106, are both disposed within imager housing 104. While described herein as being SWIR and LWIR FPAs, those skilled in the art will readily appreciate that first and second FPAS, 108 and 106, can be for a variety of wavelengths and combinations, such as visible light and LWIR, or visible light and SWIR. A DMD 114 is also within imager housing 104 and is angled with respect to optical axis A and optically coupled to primary lens 102 to selectively reflect light entering primary aperture 101 to SWIR FPA 106 and/or LWIR FPA 108.

With continued reference to FIG. 1, imaging system 100 includes a LWIR filter 110 optically coupled to LWIR FPA 108 and a SWIR filter 112 optically coupled to SWIR FPA 106. In an embodiment that includes a visible light FPA, a visible light filter can be used. Filters 110 and 112 block any unwanted wavelengths from entering into FPAs 108 and 106. DMD 114 defines a DMD axis B oblique to optical axis A. SWIR FPA 106 is aligned with DMD axis B and LWIR FPA 108 is angled with respect to DMD axis B. SWIR FPA 106 and LWIR FPA 108 are on the same side of optical axis A.

With continued reference to FIG. 1, DMD 114 includes a plurality of mirrors 116 that are selectively rotatable to adjust the DMD between at least four states. The four states include a first energized state, a second energized state, a third energized state and/or an unenergized state. In the unenergized state, shown in FIG. 1, surfaces 119 of mirrors 116 are aligned with DMD axis B to reflect light entering primary aperture 101 away from the LWIR FPA 108 and SWIR FPA 106 along an axis D, e.g. DMD 114 is not optically coupled with the FPAs in an unenergized state. In accordance with certain embodiments, in the unenergized state, the DMD may be uncontrolled, which means while the light will not be specifically directed toward the LWIR FPA 108 and the SWIR FPA 106, there is no guarantee that the light is in any particular place.

Those skilled in the art will readily appreciate the ability to direct light away from at least one of FPAs at a time removes the need for a mechanical shutter and results in quicker and quieter calibration as compared with calibration on traditional systems that use a mechanical shutter. For example, to calibrate LWIR FPA 108, DMD 114 would be energized to direct light at the SWIR FPA 106, and to calibrate the SWIR FPA 106, DMD 114 would be energized to direct light at the LWIR FPA 108. The angle of DMD 114 and its mirrors 116 with respect to aperture 101 and its optical axis A allows light to be reflected along axis D running between the FPAs during the unenergized state, but not back out of aperture 101. Even in embodiments where DMD 114 is uncontrolled in an unenergized state, mirrors 116 of the DMD will not rotate as far to reflect light back out of aperture 101. This helps to reduce chances of light being detected due to reflection back out of aperture 101.

Figure 2:
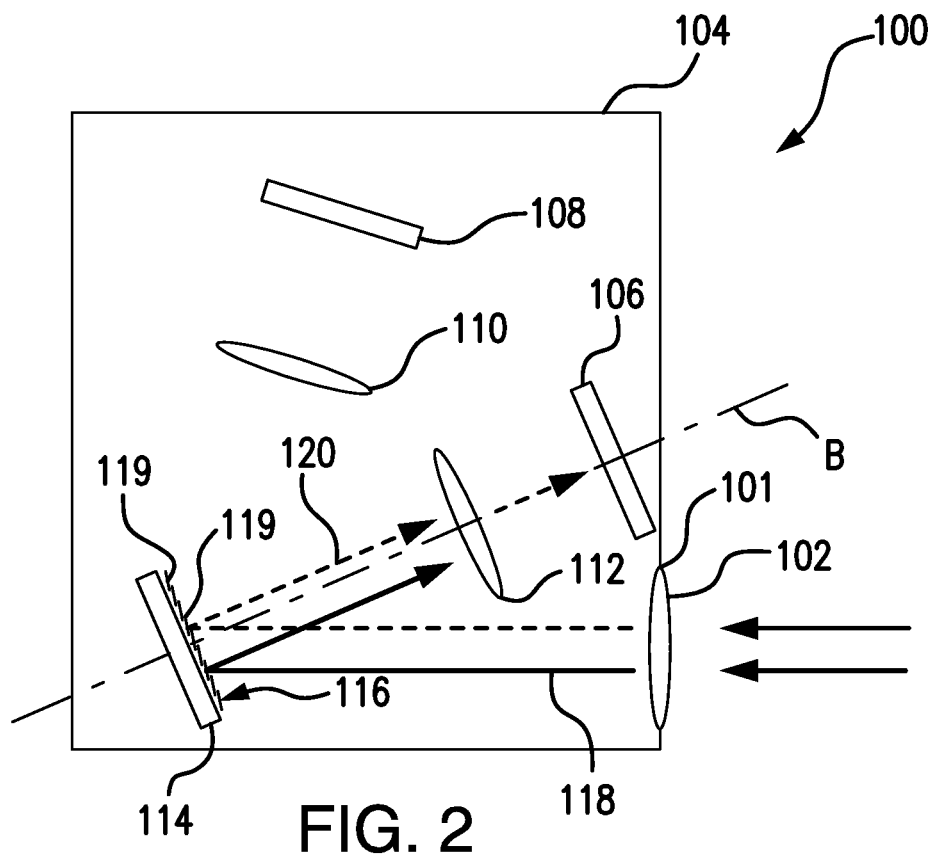
FIG. 2 is a schematic view of the imaging system of FIG. 1, showing the DMD in a first energized state.

With reference now to FIG. 2, SWIR FPA 106 is aligned along DMD axis B. When DMD 114 is in the first energized state, surfaces 119 of mirrors 116 are angled obliquely with respect to DMD axis B to reflect light entering primary aperture 101 to SWIR FPA 106 along DMD axis B. For example, SWIR wavelength light 120, LWIR wavelength light 118, and light having other wavelengths enter through aperture 101, and are reflected towards SWIR filter 112. SWIR filter 112 filters unwanted wavelengths and only allows SWIR wavelength light 120 to pass to SWIR FPA 106. Light in the SWIR band typically ranges from 0.9 to 1.7 microns.

Figure 3:
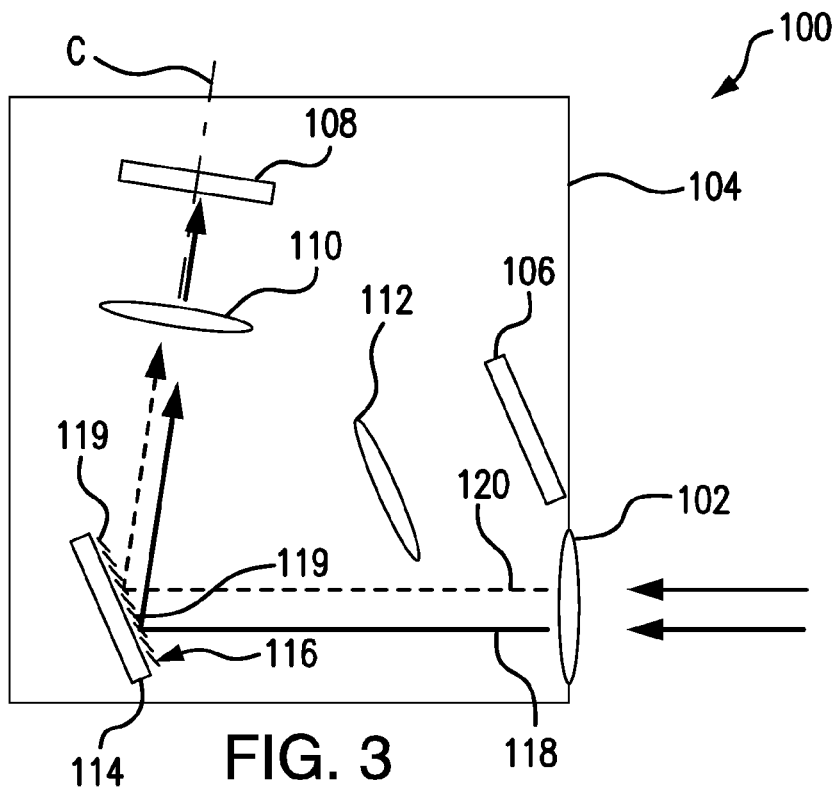
FIG. 3 is a schematic view of the imaging system of FIG. 1, showing the DMD in a second energized state.

With reference now to FIG. 3, LWIR FPA 108 defines a FPA axis C, e.g. a LWIR axis C. In the second energized state, as shown in FIG. 2, surfaces of mirrors 116 are angled obliquely with respect to DMD axis B to reflect light entering primary aperture 101 to LWIR FPA 108 along LWIR axis C. For example, SWIR wavelength light 120, LWIR wavelength light 118, and light having other wavelengths enter through aperture 101, and are reflected towards LWIR filter 110. LWIR filter 110 filters unwanted wavelengths and only allows LWIR wavelength light 118 to pass to LWIR FPA 108. Light in the LWIR band typically ranges from 8 to 15 microns.

Figure 4:
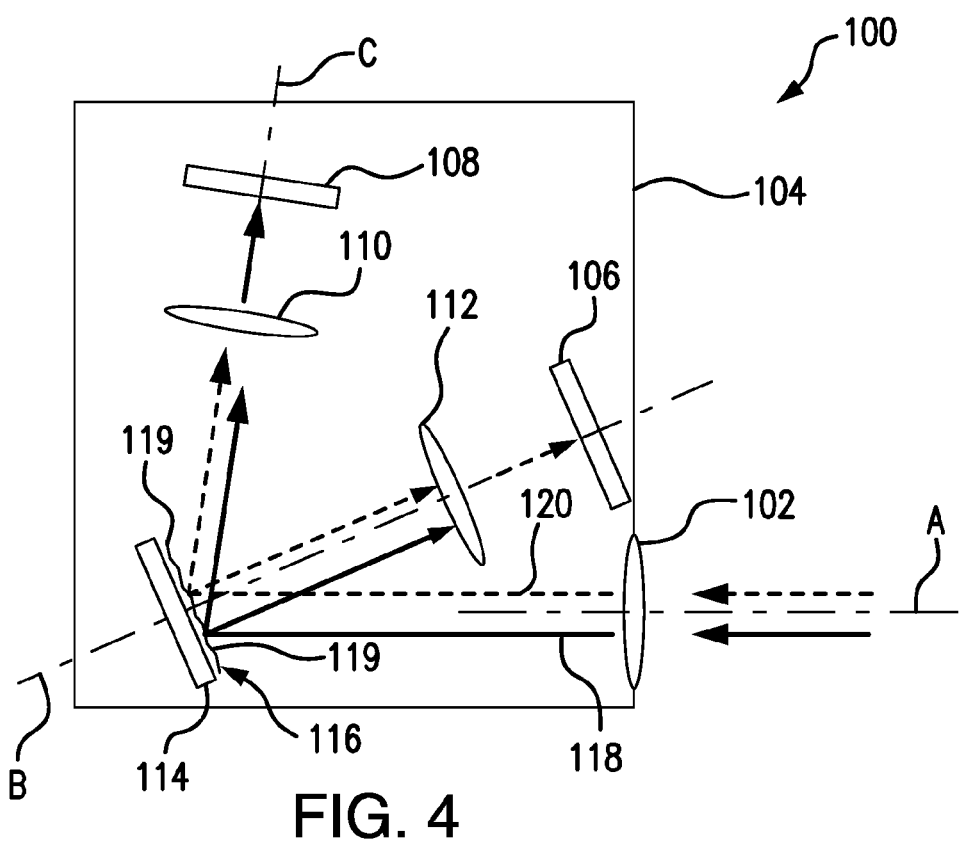
FIG. 4 is a schematic view of the imaging system of FIG. 1, showing the DMD in a third energized state.

As shown in FIG. 4, DMD 114 is in the third energized state. In the third energized state surfaces 119 of the mirrors are angled with respect to DMD axis B to reflect light entering the primary aperture 101 to LWIR FPA 108 along LWIR axis C, and/or to SWIR FPA 106 along DMD axis B. DMD 114 is controlled through a control system to either toggle the mirrors back and forth quickly between LWIR FPA 108 and SWIR FPA 106, such that the light is collected by both FPAs over their respective integration periods, or to have some mirrors 116 angled to reflect light to LWIR FPA 108 along LWIR axis C, and other mirrors 116 angled to reflect light to SWIR FPA 106 along DMD axis B. In both embodiments, mirrors 116 can be split in any ratio. For example, fifty percent of the mirrors can be reflecting light along DMD axis B and fifty percent of the mirrors can be reflecting light along LWIR axis C, or, with respect to the toggling embodiment, mirrors 116 can direct light along DMD axis B for fifty percent of the time (or duty cycle) and mirrors 116 can direct light along LWIR axis C for fifty percent of the time.

With continued reference to FIG. 4, SWIR wavelength light 120, LWIR wavelength light 118, and light having other wavelengths enter through aperture 101. Portions of each wavelength band are reflected by DMD 114 towards LWIR filter 110 and SWIR filter 112. LWIR filter 110 filters unwanted wavelengths and only allows LWIR wavelength light 118 to pass to LWIR FPA 108. SWIR filter 112 filters unwanted wavelengths and only allows SWIR wavelength light 120 to pass to SWIR FPA 112. Because SWIR FPA 106 and LWIR FPA 108 are on the same side of optical axis A, during the toggling of mirrors 116, as described above, light will not be reflected back out of aperture 101, reducing the chances of detection due to light.

The methods and systems of the present disclosure, as described above and shown in the drawings, provide for imaging systems with superior properties including improved image quality, and reduced chance of detection due to noise or light. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. An imaging system comprising:
    an imager housing having a primary aperture defining an optical axis;
    a primary lens over the primary aperture;
    a first FPA within the imager housing;
    a second FPA within the imager housing; and
    a DMD angled with respect to the optical axis and optically coupled to the primary lens to selectively reflect light entering the primary aperture to at least one of the first FPA or the second FPA.

2. The imaging system as recited in claim 1, wherein the DMD defines a DMD axis oblique to the optical axis, wherein the second FPA is aligned with the DMD axis and the first FPA is angled with respect to the DMD axis.

3. The imaging system as recited in claim 1, wherein the first FPA and the second FPA are on the same side of the optical axis.

4. The imaging system as recited in claim 1, further comprising a LWIR filter optically to the first FPA and a SWIR filter optically coupled to the second FPA, wherein the first FPA is a LWIR FPA and the second FPA is a SWIR FPA.

5. The imaging system as recited in claim 1, wherein the DMD includes a plurality of mirrors that are selectively rotatable to adjust the DMD between at least four states, wherein the at least four states include a first energized state, a second energized state, a third energized state and an unenergized state.

6. The imaging system as recited in claim 5, wherein in the unenergized state surfaces of the mirrors are aligned with the DMD axis to reflect light entering the primary aperture between the first FPA and the second FPA.

7. The imaging system as recited in claim 5, wherein in the first energized state surfaces of the mirrors are angled with respect to the DMD axis to reflect light entering the primary aperture to the second FPA along the DMD axis.

8. The imaging system as recited in claim 5, wherein the first FPA defines a FPA axis, and wherein in the second energized state surfaces of the mirrors are angled with respect to the DMD axis to reflect light entering the primary aperture to the first FPA along the FPA axis.

9. The imaging system as recited in claim 5, wherein the first FPA defines a FPA axis, wherein in the third energized state surfaces of the mirrors are angled with respect to the DMD axis to reflect light entering the primary aperture to at least one of the first FPA along the FPA axis, or the second FPA along the DMD axis.

10. The imaging system as recited in claim 1, wherein the first FPA is a LWIR FPA and the second FPA is a SWIR FPA.

* * * * *